March 14, 1939.   R. NIEWENDORP   2,150,396
SNOW PLOW
Filed Dec. 21, 1937   3 Sheets-Sheet 3

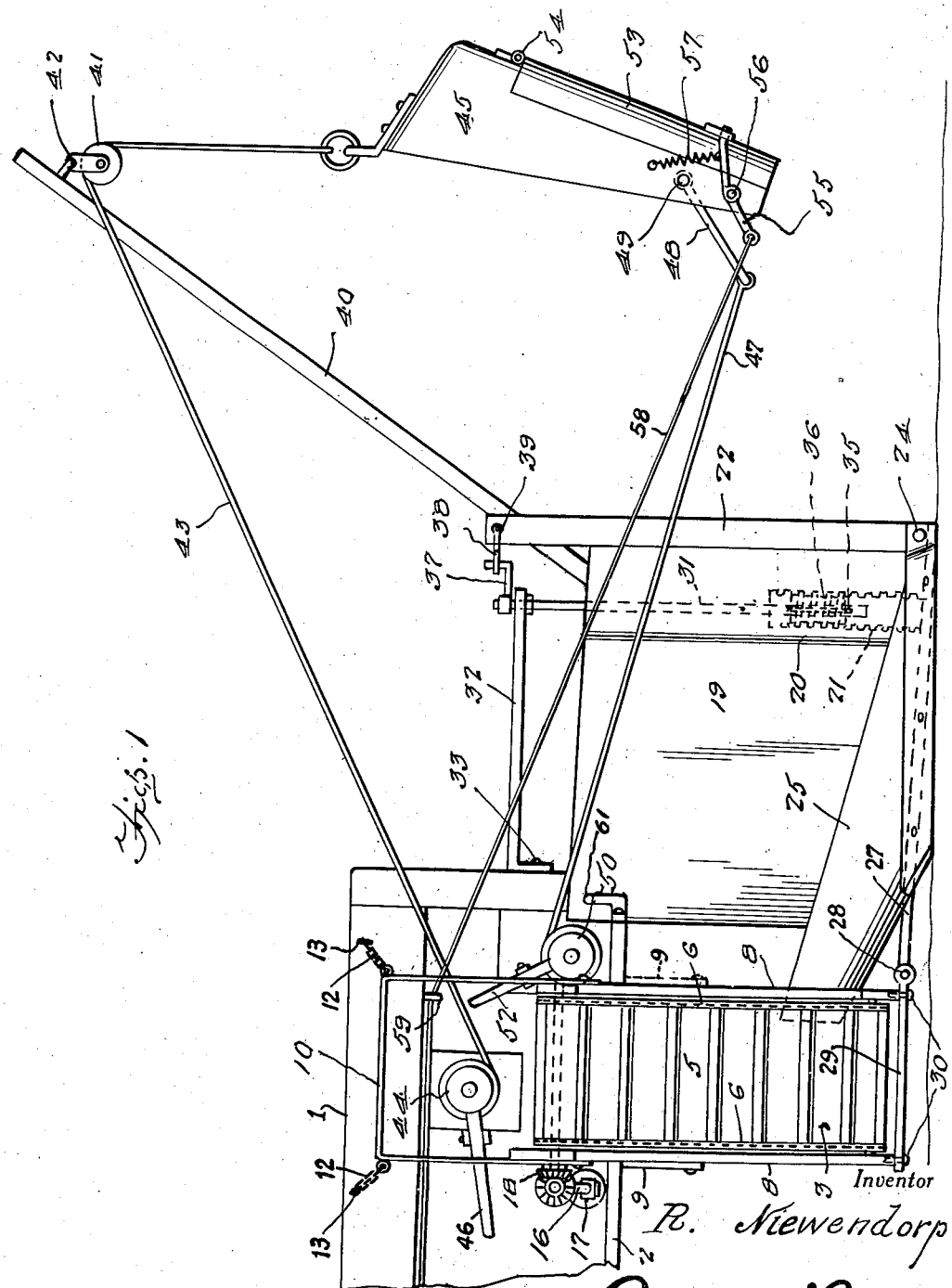

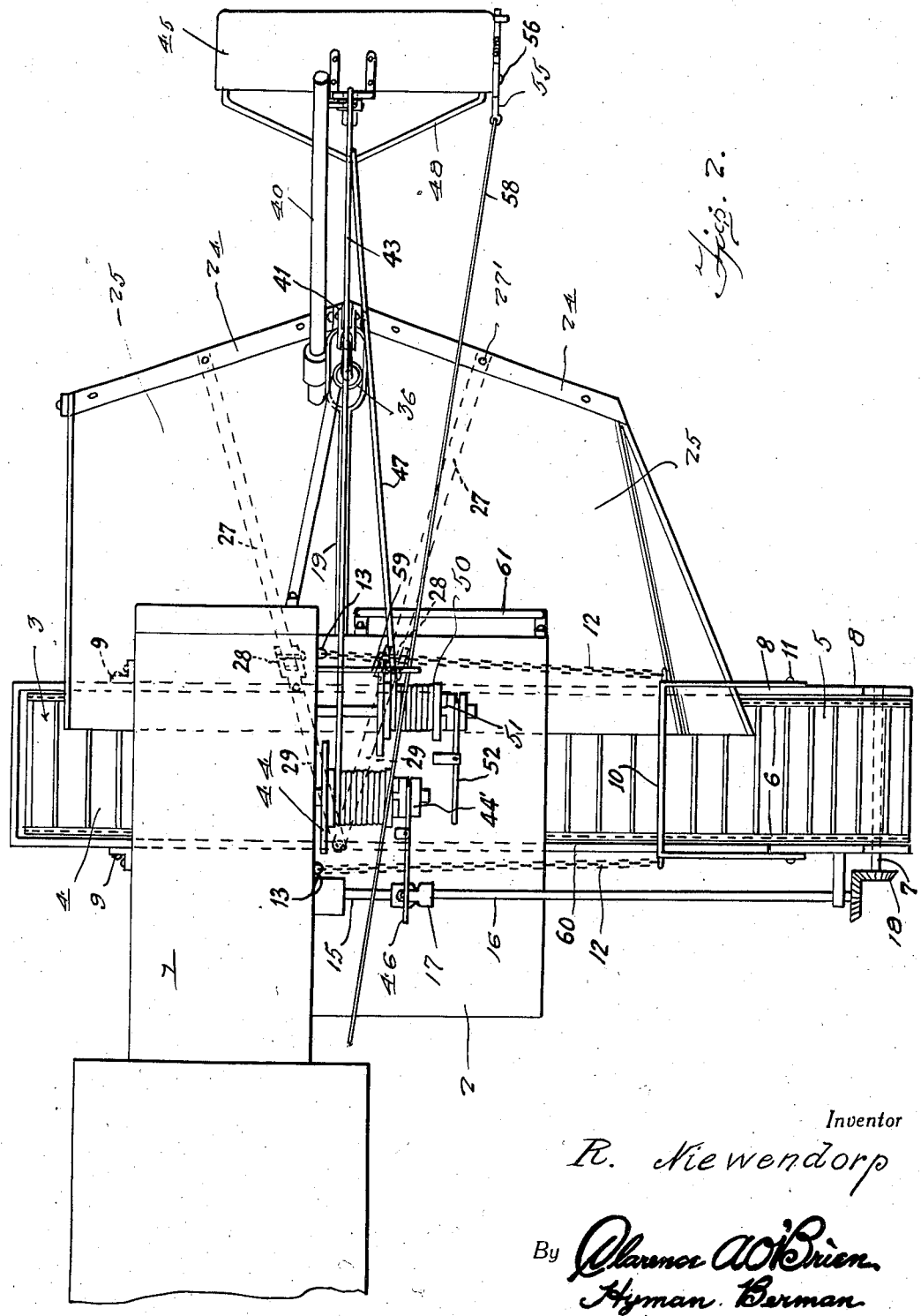

Inventor
R. Niewendorp

By Clarence A. O'Brien
Hyman Berman
Attorneys

Patented Mar. 14, 1939

2,150,396

UNITED STATES PATENT OFFICE 2,150,396

SNOW PLOW

Richard Niewendorp, Sanborn, Iowa

Application December 21, 1937, Serial No. 181,025

2 Claims. (Cl. 37—45)

My invention relates to improvements in snow plows of the tractor type.

The primary object of my invention is to equip a tractor with an efficient snow plowing and conveying apparatus for removing snow and ice from the streets and which may be readily embodied in tractors such as are used on farms without necessitating extensive alteration of the tractors.

Another object is to provide equipment of the character and for the purpose above set forth adapted to either plow up the snow or to both dig and plow the same as the occasion may require.

Still another object is to provide equipment of the character above indicated including both plowing and cutting elements vertically adjustable according to operating requirements.

Other, and subordinate objects, are also comprehended by my invention all of which together with the exact nature of my improvements, will be readily understood when the succeeding description and claims are read with reference to the drawings accompanying and forming part of this specification.

Figure 4:
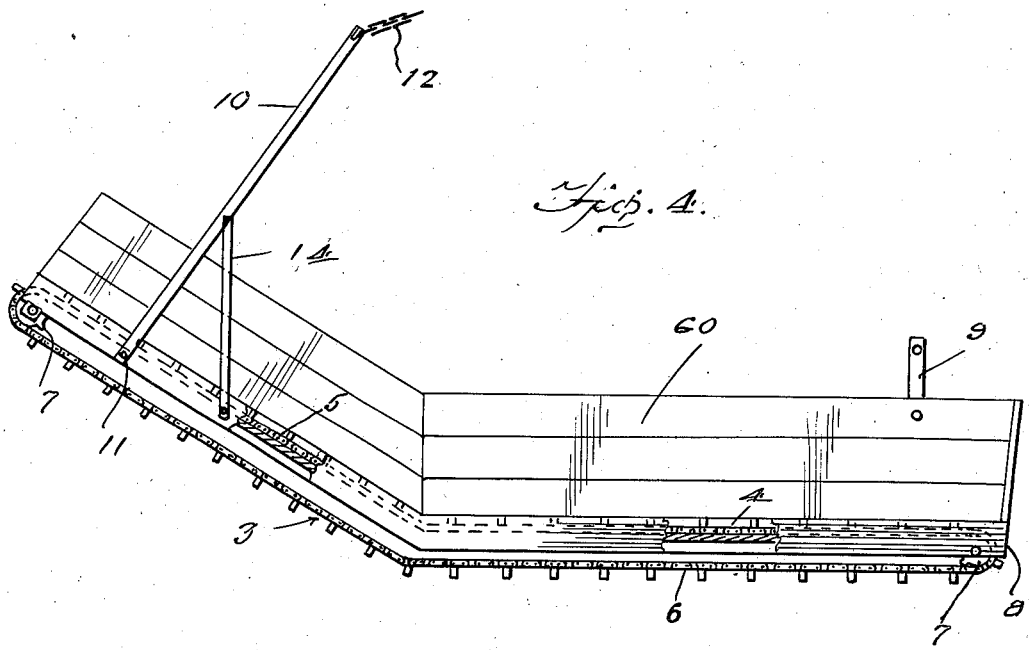
Figure 3:
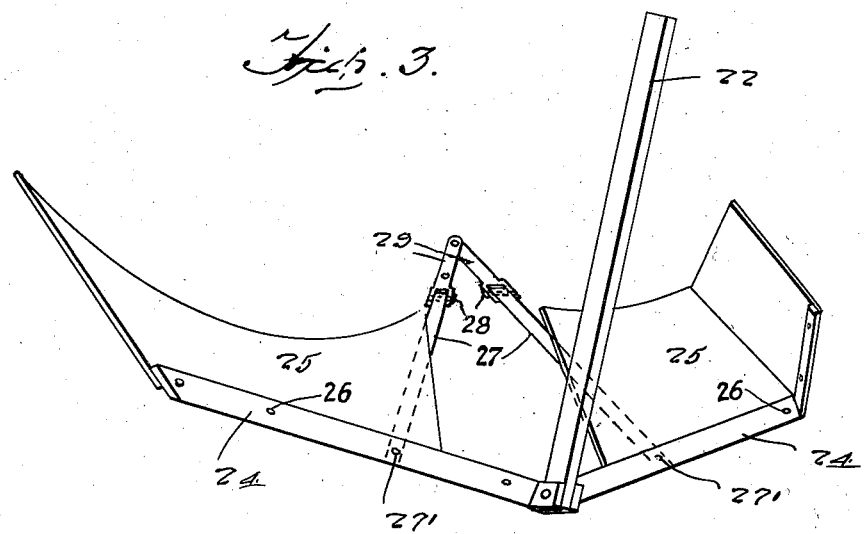

In said drawings:

Figure 1 is a fragmentary view in side elevation illustrating a tractor equipped according to my invention, Figure 2 is a view in top plan, Figure 3 is a view in perspective of cutting bars and scoops to be presently described in detail, and Figure 4 is a view partly in side elevation and partly in longitudinal section of the conveyor and parts associated therewith.

Referring to the drawings by numerals, according to my invention the front part of the tractor 1 has suitably secured thereto, preferably to the chassis, not shown, a platform 2 extending to the right hand side of said tractor. Below the platform 2 and adjacent the ground is an endless conveyor 3 extending at its opposite ends on opposite sides of the tractor 1 and having a horizontal run 4 beneath the tractor 1 and platform 2 and upwardly inclined discharge end 5 on the platform side of the tractor 1 extending beyond said platform. The conveyor 3 embodies the usual sprocket side chains 6 running on sprocket wheels, as at 7, suitably mounted at opposite ends of a conveyor frame 8. The frame 8 is pivotally mounted, at one end, to the side of the tractor 1, opposite the platform 2, as by hanger brackets, one of which is shown in full lines at 9 in Figures 1, 2 and 4, and upon which brackets said frame 8 and conveyor 3 are vertically swingable to adjust the discharge end 5 of the latter to different levels as occasion may require. An upstanding U-shaped bail 10 is fixed, as at 11, to the conveyor frame 8, at the discharge end of the latter, and secured by chains 12 to eye bolts 13 provided on the tractor 1. The bail 10 is braced by brace bars 14 extending between the same and the conveyor frame 8. The chains 12 are detachably secured to the eye bolts 13 so that the length attached thereto may be shortened or lengthened to vary the level of the discharge end 5 of the conveyor 3 as will be understood. The conveyor 3 is designed to be driven by means of a drive shaft 15 extending from one side of the tractor 1 and driven in any suitable manner by the driving mechanism of the latter, an extension shaft 16 connected at one end to the extending end of the drive shaft 15 by means of a universal joint 17, and a beveled gear drive 18 between the other end of said shaft 16 and the sprocket wheels 7 on the discharge end of said conveyor 3.

Extending forwardly from the front edge of the platform 2, adjacent the tractor 1, is a vertical plate-like baffle, or deflector, 19 of rectangular form having a lower edge suitably spaced above the ground to clear the same and a somewhat thickened vertical front edge 20 provided in the lower end thereof with a threaded bore 21. The baffle 19 functions as a vertical plow for splitting snow drifts and ice and as a deflector for throwing snow to either side thereof. Suitably mounted on the front edge 20 of the baffle 19 is an upstanding cutter bar 22 of suitable hard metal. A pair of horizontally disposed cutter bars 24 extend laterally from the lower end of the cutter bar 22 on opposite sides thereof, respectively, in rearwardly diverging relation to form a V-shaped lower cutting assembly. A pair of scoops 25 are secured at their front edges, as at 26, to the cutter bars 24, respectively, to extend on opposite sides of the baffle 19 rearwardly and upwardly over the horizontal run 4 of the conveyor 3.

The baffle 19, cutter bars 22 and 24, and the scoops 25 form a unit which is mounted on the conveyor frame 8 for vertically swinging movement to adjust the height of the same from the ground in accordance with the depth of the plowing desired. The mounting for the described unit comprises a pair of pusher bars 27 having front ends connected by rivets 27' to the cutter bars 24, respectively, and converging rearwardly, their rear ends being pivotally connected, as at 28, to bracket arms 29 bolted, as at 30, to the frame 8 and upon which said pusher bars 27 and unit are vertically swingable. Adjustment of the described unit is effected by means of a worm shaft 31 depending from one end of a bracket arm 32 secured at its other end to the tractor 1, as at 33, to extend forwardly thereof, the shaft 31 being mounted in said arm 32 to rotate therein and swing thereon, for a purpose presently apparent. The lower end of the shaft 31 extends through the front edge 20 of the baffle 19 into the bore 21 and has keyed thereon, as at 35, a worm 36 cooperating with the threads in the beforementioned bore 21, the arrangement being such that when the shaft 31 is rotated in opposite directions the worm 36 will elevate and lower the described unit, respectively, on the pivots 29. A crank 37 is provided on the upper end of the shaft 31 for manual rotation of said shaft. The crank 37 and the shaft 31 may be locked against accidental rotation by means of a link 38 pivoted to the cutter bar 22, as at 39, and looping over said crank.

Extending upwardly and forwardly from the baffle 19 is a boom 40 suitably secured to said baffle and having a sheave 41 suitably mounted on the front end thereof as by the swivel mounting 42. A cable 43 extending from a hoisting drum 44, on the tractor 1, and trained over said sheave 41 suspends a drop bottom scoop 45 in front of the scoops 25 and cutter bars 22 and 24. The hoisting drum 44 is rotatably mounted on one side of the tractor 1 over the platform 2 for operation by the mechanism of the latter in any suitable manner under control of a clutch 44' operative by a clutch engaging lever 46. A pull cable 47 is connected to a bail 48 pivoted, as at 49, to the front end of the scoop 45 to be reeled up on a drum 50 for manipulation of said scoop 45 as will be understood. The drum 50 is rotatably mounted on the tractor 1 for operation by the latter as in the case of the drum 44 under control of a clutch 51 and clutch lever 52. The scoop 45 may be of any suitable type, for instance, with a drop bottom 53 pivoted, as at 54, for swinging movement under release and a locking bail 55 pivoted on the scoop as at 56 for operation against the tension of a spring 57 by a pull cable 58 extending through guides 59 on the tractor 1 to within reach of the operator.

As best shown in Figure 4, the rear side of the conveyor frame 8 may have attached thereto an upstanding abutment wall member 60 to prevent the snow from the scoops 25 from being thrown over the conveyor 3.

Referring to the operation, the unit comprising the baffle 19, cutter bars 22, 24 and the scoops 25 are set the required height by raising or lowering on the pivots 9 and the apparatus is driven into the snow to plow up the same in the scoops 25 which deposit it on the conveyor 3, the latter being driven by the described drive 15, 16, 17 and 18 and carrying the deposit thereon to the discharge end 5 for discharging to one side of the road. The conveyor 3, as will be understood, may be adjusted by the described chains 12 to the appropriate level for discharging at the side of the road. In the case of hard packed snow, or ice, the scoop 45 is manipulated to dig up the snow in advance of the scoops 25 and also to deposit in the right hand scoop 25 all under the control of the clutches 44' and 51.

An abutment casting 61 is secured on the front edge of the platform 2 on the right hand side of the deflector 19. By pulling the scoop 45 inwardly the locking bail 55 may be engaged with said abutment and the scoop dumped automatically in the right hand scoop 25.

The invention will, it is believed, be understood from the foregoing without further explanation.

Manifestly, modifications both in relation to parts and structure described may be resorted to without departing from the inventive concept and right is herein reserved to all such modifications falling within the scope of the subjoined claims.

What I claim is:

1. In apparatus of the class described, the combination with a tractor, of a conveyor suspended from the body thereof to extend to one side of the same, a vertically disposed plate-like plow member extending forwardly of said conveyor, a pair of upwardly and rearwardly inclined scoops mounted on said member on opposite sides thereof, respectively, and having rear ends overlying said conveyor, a boom extending upwardly and forwardly from said member and beyond said scoops, and a digger scoop suspended from said boom, and operative to dump into said first mentioned scoops.

2. In apparatus of the class described, the combination with a tractor, of a conveyor suspended from the body thereof to extend to one side of the same, a vertically disposed plate-like plow member extending forwardly of said conveyor, a pair of upwardly and rearwardly inclined scoops mounted on said member on opposite sides thereof, respectively, and having rear ends overlying said conveyor, a boom extending upwardly and forwardly from said member and beyond said scoops, and a digger scoop suspended from said boom, and operative to dump into one of said first mentioned scoops, said first mentioned scoops and the conveyor being relatively adjustable vertically.

RICHARD NIEWENDORP.